United States Patent
Jeon et al.

(10) Patent No.: US 10,474,262 B2
(45) Date of Patent: Nov. 12, 2019

(54) TOUCH SCREEN-INTEGRATED DISPLAY DEVICE AND METHOD FOR FABRICATING THE SAME

(71) Applicant: LG Display Co., Ltd., Seoul (KR)

(72) Inventors: Yoongu Jeon, Gyeongsangbuk-do (KR); Ru-Da Lee, Jeollabuk-do (KR); Jonghwan Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 57 days.

(21) Appl. No.: 15/379,221

(22) Filed: Dec. 14, 2016

(65) Prior Publication Data

US 2017/0192569 A1    Jul. 6, 2017

(30) Foreign Application Priority Data

Dec. 31, 2015    (KR) .................. 10-2015-0191838

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC ................. G06F 3/0412; G06F 3/041–047
See application file for complete search history.

(56) References Cited

U.S. PATENT DOCUMENTS 8,686,935 B2   4/2014   Jo et al.
8,970,532 B2   3/2015   Kim et al.
(Continued)

FOREIGN PATENT DOCUMENTS

CN   102110424 A    6/2011
CN   103365461 A   10/2013
(Continued)

OTHER PUBLICATIONS

European Extended Search Report, European Application No. 16206803.5, dated May 19, 2017, 8 pages.
(Continued)

*Primary Examiner* — Hang Lin
(74) *Attorney, Agent, or Firm* — Fenwick & West LLP

(57) ABSTRACT

There is provided a touch screen-integrated display device including a plurality of gate lines, a plurality of data lines, a touch sensing line, a plurality of subpixel areas, a gate electrode provided in each of the subpixel areas, an active layer, a source electrode and a drain electrode, a gate insulator, a pixel electrode, and a sensing contact part. The sensing contact part includes a portion that is formed of the same material as the pixel electrode.

Further, there is provided a method for fabricating a touch screen-integrated display device, including forming a gate electrode, forming an active layer, a source electrode, a drain electrode, and a data line, forming a pixel electrode and a touch sensing line, and forming a common electrode to be overlapped with the pixel electrode. Thus, there is an effect of reducing the number of mask processes.

21 Claims, 19 Drawing Sheets

(51) Int. Cl.
*G02F 1/1333* (2006.01)
*G09G 3/36* (2006.01)

(52) U.S. Cl.
CPC .. *G06F 3/0416* (2013.01); *G06F 2203/04103* (2013.01); *G09G 3/3674* (2013.01); *G09G 3/3685* (2013.01); *G09G 2310/08* (2013.01)

(56) References Cited

U.S. PATENT DOCUMENTS

| | | | |
|---|---|---|---|
| 9,046,955 B1 | 6/2015 | Lee et al. | |
| 9,823,765 B2 | 11/2017 | Lee et al. | |
| 10,318,035 B2 | 6/2019 | Lee et al. | |
| 2010/0149128 A1 | 6/2010 | No et al. | |
| 2011/0069057 A1* | 3/2011 | Cho | G09G 3/3648 345/211 |
| 2011/0157107 A1 | 6/2011 | Jo et al. | |
| 2012/0218199 A1* | 8/2012 | Kim | G06F 3/0412 345/173 |
| 2013/0257774 A1 | 10/2013 | Kim et al. | |
| 2015/0309634 A1* | 10/2015 | Lee | G06F 3/0412 345/173 |
| 2015/0331530 A1* | 11/2015 | Kim | G06F 3/0412 345/174 |
| 2018/0107318 A1 | 4/2018 | Lee et al. | |

FOREIGN PATENT DOCUMENTS

| | | |
|---|---|---|
| CN | 104808376 A | 7/2015 |
| CN | 105045440 A | 11/2015 |

OTHER PUBLICATIONS

Chinese Office Action, Chinese Patent Application No. 201611178092.8, dated Jun. 4, 2019, 10 pages.

* cited by examiner

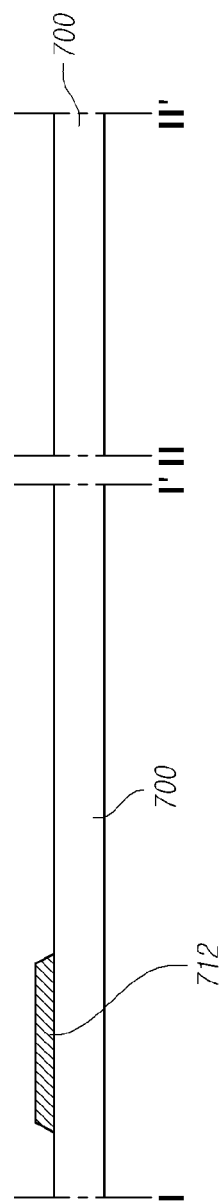

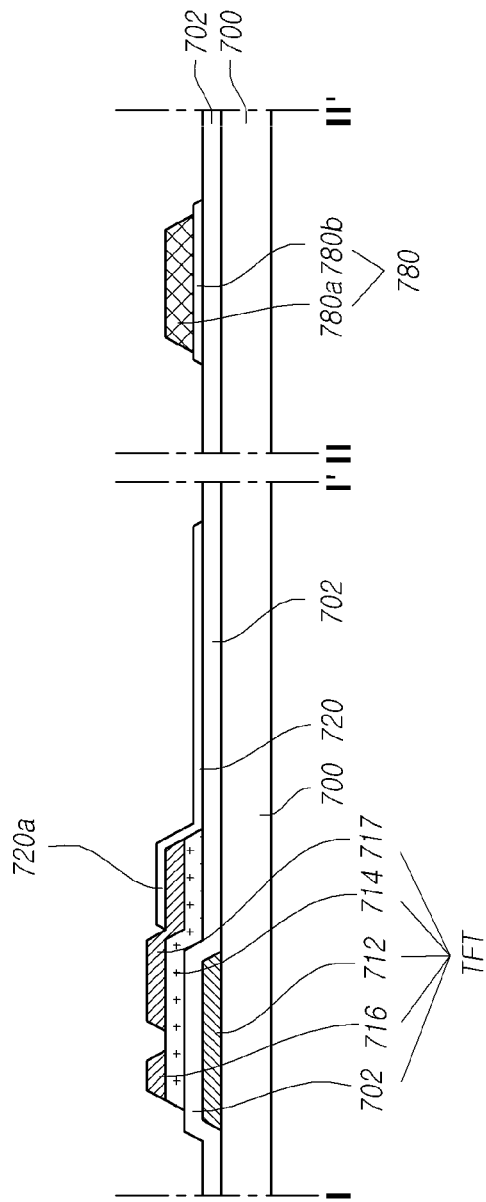

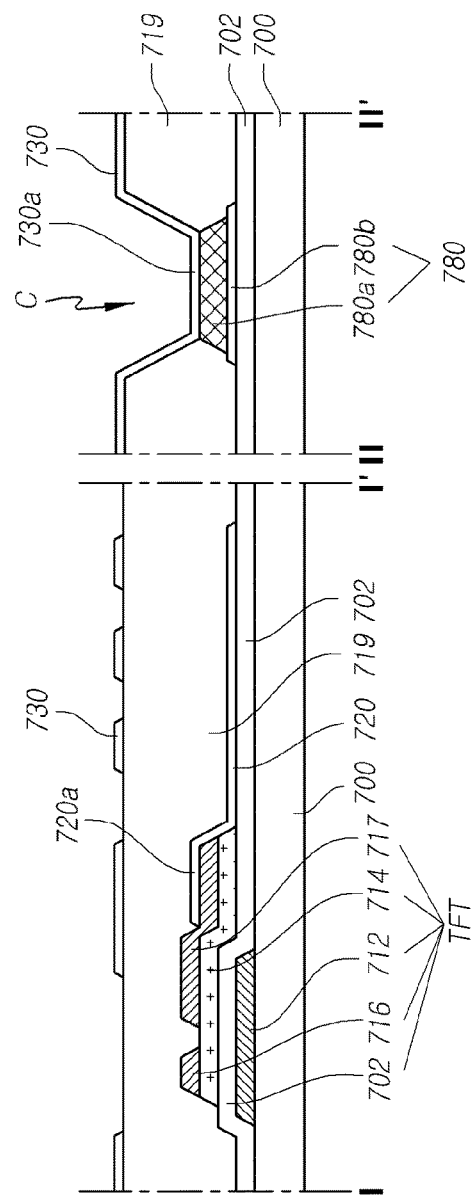

TOUCH SCREEN-INTEGRATED DISPLAY DEVICE AND METHOD FOR FABRICATING THE SAME

CROSS-REFERENCE TO RELATED APPLICATIONS

This application claims priority from Republic of Korea Patent Application No. 10-2015-0191838, filed on Dec. 31, 2015, which is hereby incorporated by reference in its entirety.

BACKGROUND

Field of Technology

The present invention relates to a touch screen-integrated display device and a method for fabricating the same.

Description of the Related Art

With progress of the information-oriented society, various types of demands for display devices for displaying an image are increasing. Recently, various types of display devices such as a liquid crystal display (LCD) device, a plasma display panel (PDP) device, or an organic light emitting display (OLED) device have been used.

Such display devices are breaking away from conventional input systems, such as a button, a keyboard and a mouse, and provide a touch-based input method which allows a user to intuitively and conveniently input information or commands.

In order to provide such a touch-based input system, it is required to identify a touch or non-touch of a display device by a user and detect exact touch coordinates.

To this end, according to the related art, one of various touch modes such as a resistance film mode, a capacitance mode, an electromagnetic induction mode, an infrared mode, and an ultrasonic mode is adopted to provide touch sensing.

Further, regarding application of a touch screen to a display device, a technology of installing a touch sensor within a display device has been developed. In particular, an in-cell type display device using a common electrode formed on a lower substrate as a touch electrode has been developed.

However, in the in-cell type display device, a separate touch sensing line connected to a touch electrode needs to be formed, which requires an additional process with high manufacturing costs and a long manufacturing time.

SUMMARY

An aspect of the present disclosure provides a touch screen-integrated display device and a method for fabricating the touch screen-integrated display device in which thin film transistors are disposed in a zigzag shape in subpixels on the left and right sides of a data line. Thus, the number of data lines disposed on a display panel can be reduced.

Further, another aspect of the present disclosure provides a touch screen-integrated display device and a method for fabricating the touch screen-integrated display device in which touch sensing lines are formed at the same time when pixel electrodes are formed. Thus, the number of mask processes can be reduced.

According to an aspect of the present disclosure, there is provided a touch screen-integrated display device including: a plurality of gate lines disposed in a first direction on a substrate; a plurality of data lines disposed in a second direction on the substrate, the second direction different from the first direction; a touch sensing line disposed in the second direction, the touch sensing line disposed between the plurality of data lines on the substrate; a plurality of subpixel areas defined by the plurality of gate lines, the plurality of data lines, and the touch sensing line; a gate electrode of a transistor provided in a subpixel area from the plurality of subpixel areas, the gate electrode connected to one of the plurality of gate lines; an active layer on the gate electrode; a source electrode and a drain electrode of the transistor on the active layer; a gate insulator between the gate electrode and the active layer; a pixel electrode including a first portion and a second portion, the first portion of the pixel electrode on the drain electrode and the second portion of the pixel electrode on the gate insulator; and a sensing contact part provided on the gate insulator and connected to the touch sensing line, the sensing contact part including a first sensing contact pattern and a second sensing contact pattern, and wherein the second sensing contact pattern comprises a same material as the pixel electrode.

Further, according to another aspect of the present disclosure, there is provided a method for fabricating a touch screen-integrated display device, including: forming a gate electrode on a substrate using a first mask process; forming a gate insulator over the gate electrode using a second mask process; forming a semiconductor layer and an electrode metal layer on the gate insulator using the second mask process; forming an active layer, a source electrode, a drain electrode, and a data line using the second mask process, the source electrode and the drain electrode formed from the electrode metal layer; sequentially forming a first transparent conductive material layer on a portion of the drain electrode and a sensing metal layer on the gate insulator using a third mask process; forming a pixel electrode from the first transparent conductive material layer and a touch sensing line and a sensing contact part from the sensing metal layer using the third mask process; forming a protective layer over the pixel electrode and the touch sensing line using a fourth mask process; forming a contact hole through the protective layer that exposes a portion of the sensing contact part using the fourth mask process; forming a second transparent conductive material layer on the protective layer that is in contact with the sensing contact part via the contact hole using a fifth mask process; and forming a common electrode that is overlapped with the pixel electrode from the second transparent conductive material layer through the fifth mask process. Thus, there is an effect of reducing the number of mask processes.

Further, according to an aspect of the present disclosure, there is provided a touch screen-integrated display device including: a gate line extending along a first direction on a substrate; a plurality of data lines extending along a second direction, the plurality of data lines on a gate insulator that is on the substrate; a touch sensing line between the plurality of data lines on the substrate; a subpixel at an intersection of the gate line and one of the plurality of data lines, the subpixel including: a transistor including: a gate electrode on the substrate, a part of the gate insulator over the gate electrode, an active layer on the part of the gate insulator that is over the gate electrode, a drain electrode on the active layer, a source electrode on the active layer, and a pixel electrode that is electrically connected to the drain electrode; a sensing contact part on the gate insulator, the sensing contact part connected to the touch sensing line, and wherein a portion of the sensing contact part comprises a same material as the pixel electrode.

In a touch screen-integrated display device and a method for fabricating the same according to the present disclosure, thin film transistors are disposed in a zigzag shape in subpixels on the left and right sides of a data line. Thus, there is an effect of reducing the number of data lines disposed on a display panel.

Further, in a touch screen-integrated display device and a method for fabricating the same according to the present invention, touch sensing lines are formed at the same time when pixel electrodes are formed. Thus, there is an effect of reducing the number of mask processes.

BRIEF DESCRIPTION OF THE DRAWINGS

The above and other aspects, features and other advantages of the present invention will be more clearly understood from the following detailed description taken in conjunction with the accompanying drawings, in which:

FIGS. 10A, 10B, 11A, 11B, 12A, 12B, 13A, 13B, 14A, and FIG. 14B are diagrams illustrating processes for fabricating a touch screen-integrated display device according to the present disclosure.

DETAILED DESCRIPTION

Figure 1:
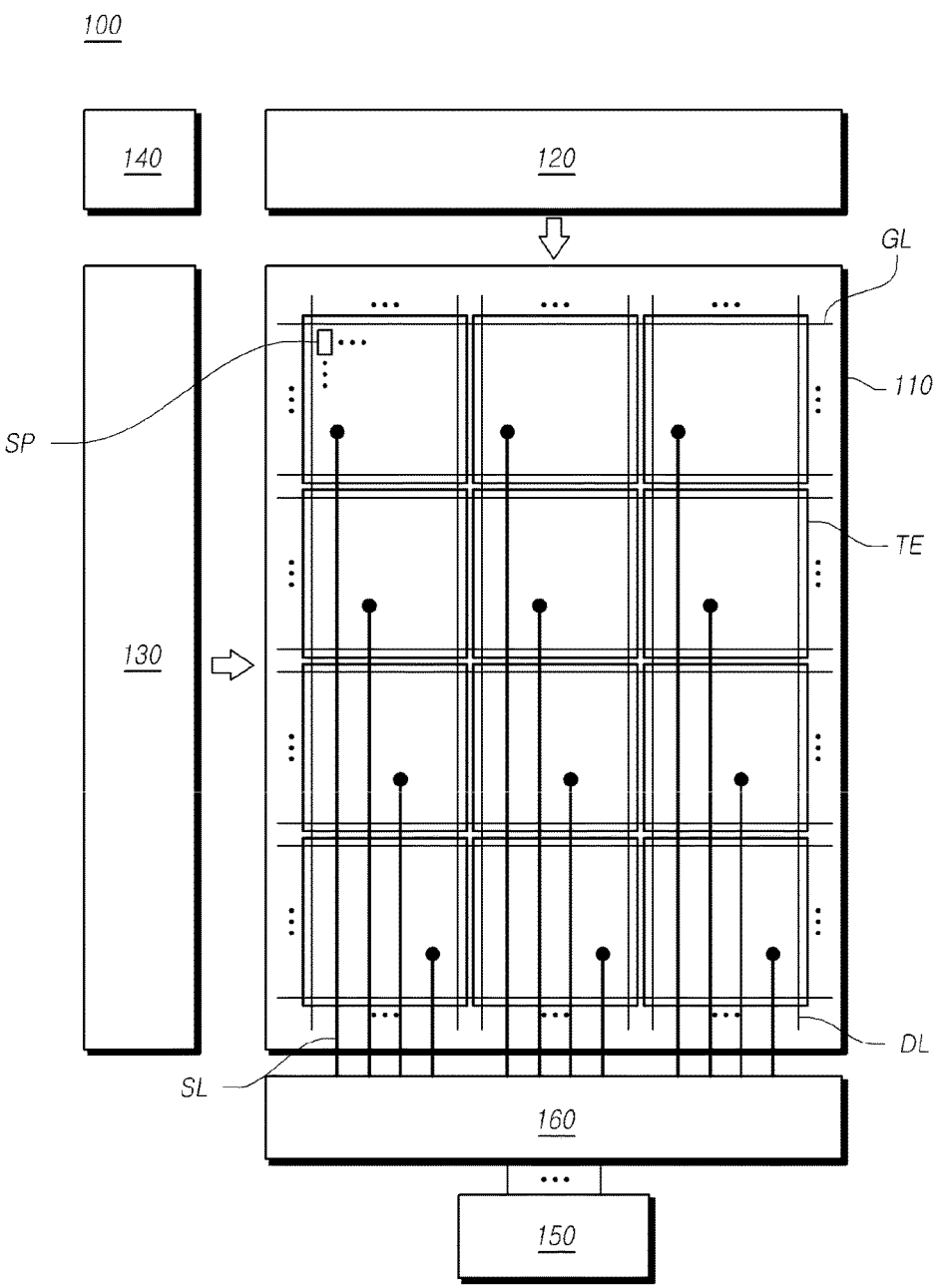
FIG. 1 is a configuration view of a touch screen-integrated display device according to the present disclosure.

Advantages and features of the present disclosure, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification. Further, in the following description, a detailed explanation of well-known related technologies may be omitted to avoid unnecessarily obscuring the subject matter of the present invention.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the time sequence between two or more incidents is described using the terms such as "after", "subsequent to", "next to", and "before", two or more incidents may be inconsecutive unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present invention.

The features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present invention will be described in detail with reference to the accompanying drawings. Also, the size and thickness of the device might be expressed to be exaggerated for the sake of convenience in the drawings. Like reference numerals generally denote like elements throughout the present specification.

FIG. 1 is a configuration view of a touch screen-integrated display device according to the present disclosure.

Referring to FIG. 1, a touch screen-integrated display device 100 according to the present disclosure is a display device capable of providing an image display function (display function) and a touch sensing function.

The touch screen-integrated display device 100 according to the present disclosure may be, for example, a medium and large device, such as a television (TV) or a monitor, or a mobile device, such as a smartphone or a tablet personal computer (PC), having a touch sensing function in response to a touch input.

Referring to FIG. 1, the touch screen-integrated display device 100 according to the present disclosure includes a display panel 110, a data driver 120, a gate driver 130, and a controller 140 in order to provide the display function.

The display panel 110 may include a plurality of data lines DL disposed in a first direction (for example, in a column direction) and a plurality of gate lines GL disposed in a second direction (for example, in a row direction).

The data driver 120 drives the plurality of data lines DL. Herein, the data driver 120 may also be referred to as "source driver".

The gate driver 130 drives the plurality of gate lines GL. Herein, the gate driver 130 may also be referred to as "scan driver".

The controller 140 controls the data driver 120 and the gate driver 130. In order to do so, the controller 140 supplies various control signals to the data driver 120 and the gate driver 130.

The controller 140 starts a scan according to timing implemented in each frame, converts image data input from the outside to be suitable for a data signal form used by the data driver 120, outputs the converted image data, and controls a driving of data at a proper time corresponding to the scan.

The controller 140 may be a timing controller used in a general display technology or a controller including the timing controller and performing additional control functions.

The gate driver 130 sequentially supplies an ON voltage or OFF voltage scan signal to the plurality of gate lines according to the control of the controller 140.

If a specific gate line is opened by the gate driver 130, the data driver 120 converts the image data received from the controller 140 into a data voltage of an analog form and supplies the data voltage to the plurality of data lines DL.

The data driver 120 is located at only one side (for example, upper side or lower side) of the display panel 110 in FIG. 1, but may be located at both sides (for example, upper side and lower side) of the display panel 110 depending on the driving method, the design method of the panel, or the like.

The gate driver 130 is located at only one side (for example, left side or right side) of the display panel 110 in FIG. 1, but may be located at both sides (for example, left side and right side) of the display panel 110 depending on the driving method, the design method of the panel, or the like.

The aforementioned controller 140 receives input image data together with various timing signals, such as a vertical synchronization signal Vsync, a horizontal synchronization signal Hsync, an input data enable (DE) signal, and a clock signal CLK from the outside (for example, a host system).

The touch screen-integrated display device 100 according to the present disclosure may be any one of various devices such as a liquid crystal display device, an organic light emitting display device, and a plasma display device. For example, the touch screen-integrated display device 100 may be an in-plane switching (IPS) mode liquid crystal display device in which liquid crystal molecules are aligned horizontally and rotated in place to display an image and which has advantages of high resolution, low power consumption, wide viewing angle, and the like. More specifically, the touch screen-integrated display device 100 may be an advanced high performance-IPS (AH-IPS) mode liquid crystal display device.

Each subpixel SP disposed in the display panel 110 may be configured to include circuit elements such as a transistor.

Meanwhile, the touch screen-integrated display device 100 according to the present disclosure may include a touch system in order to provide the touch sensing function.

Referring to FIG. 1, the touch system may include a plurality of touch electrodes TE functioning as touch sensors and a touch circuit 150 configured to sense a touch by driving the plurality of touch electrodes TE.

The touch circuit 150 sequentially supplies a touch drive signal to the plurality of touch electrodes TE to sequentially drive the plurality of touch electrodes TE.

Then, the touch circuit 150 receives a touch sensing signal from a touch electrode to which the touch drive signal is applied.

The touch circuit 150 may identify a touch or non-touch and calculate touch coordinates on the basis of touch sensing signals received from the plurality of touch electrodes TE.

Herein, the touch drive signal may have, for example, a waveform of a pulse-modulated signal having two or more voltage levels.

The touch sensing signals received from the plurality of touch electrodes TE may vary depending on whether or not a touch is input by a pointer such as a finger or a pen around the corresponding touch electrodes.

The touch circuit 150 may identify a touch or non-touch and obtain touch coordinates by obtaining a capacitance variation (or voltage variation or charge variation) in the touch electrodes TE on the basis of the touch sensing signals.

Referring to FIG. 1, each of the touch electrodes TE is connected to a touch sensing line SL in order to supply a touch drive signal to each of the plurality of touch electrodes TE.

Further, in order to sequentially supply a touch drive signal to the plurality of touch electrodes TE, the touch system may further include a switch circuit 160 configured to sequentially connect the touch circuit 150 to the touch sensing lines SL respectively connected to the plurality of touch electrodes TE.

The switch circuit 160 may include at least one multiplexer.

Meanwhile, referring to FIG. 1, each of the plurality of touch electrodes TE may be formed into a block shape.

Further, each touch electrode TE may have a size equal or corresponding to a size of one subpixel area SP.

Otherwise, each touch electrode TE may have a size greater than a size of one subpixel area SP as illustrated in FIG. 1.

That is, each touch electrode TE area may have a size corresponding to a size of at least two subpixel areas SP.

Meanwhile, referring to FIG. 1, the plurality of touch electrodes TE may be built in the display panel 110.

In this sense, it can be said that the display panel 110 may be integrated with a touch screen or a touch screen panel. That is, the display panel 110 may be an in-cell or on-cell touch screen-integrated display panel.

Meanwhile, the touch screen-integrated display device 100 according to the present disclosure may operate in a display mode in order to provide the display function, or may operate in a touch mode in order to provide the touch sensing function.

In this regard, the plurality of touch electrodes TE may operate as touch sensors during the touch mode, and may be used as display mode electrodes during the display mode.

For example, during the display mode, the plurality of touch electrodes TE may operate as common electrodes to which a common voltage Vcom is applied, as an example of a display mode electrode.

Herein, the common voltage Vcom corresponds to a pixel voltage to be applied to a pixel electrode.

Figure 2:
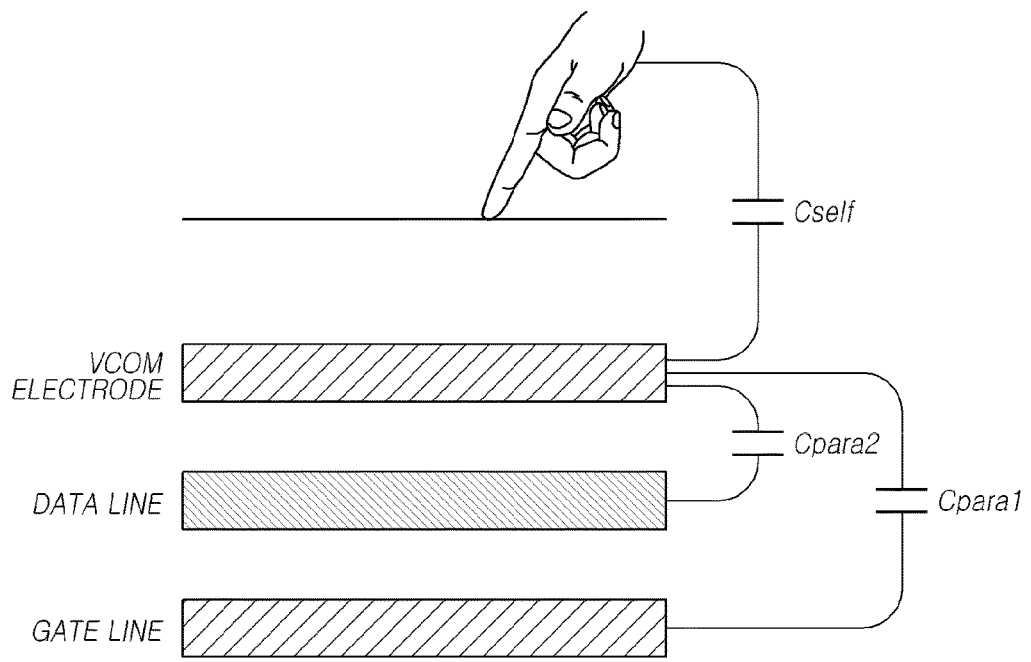
FIG. 2 is a diagram illustrating capacitance components (Cself, Cpara1 and Cpara2) generated during a touch mode in the touch screen-integrated display device according to the present disclosure.

FIG. 2 is a diagram illustrating capacitance components (Cself, Cpara1 and Cpara2) generated during a touch mode in the touch screen-integrated display device 100 according to the present disclosure.

Referring to FIG. 2, the plurality of touch electrodes TE, which functions as the touch electrodes in the touch mode and the common electrodes (Vcom electrodes) which form liquid crystal capacitors together with the pixel electrodes in the display mode, generates a self-capacitance Cself together with a pointer, such as a finger or pen, in order to detect a touch and the coordinates of the touch in the touch mode.

Meanwhile, the plurality of touch electrodes TE functioning as the common electrodes may also generate parasitic capacitances Cpara1 and Cpara2 together with a gate line and a data line. However, the parasitic capacitances Cpara1 and Cpara2 are negligible since they are much smaller than the self-capacitance.

Figure 3:
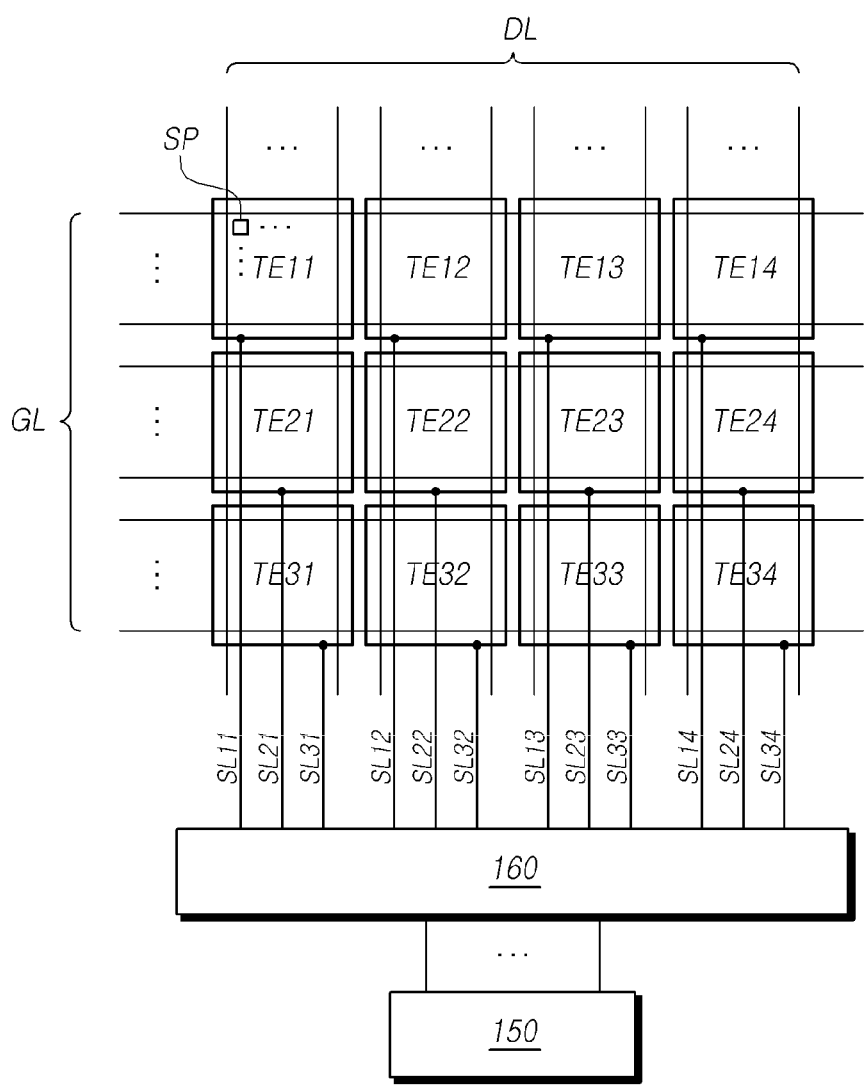
FIG. 3 is a plan view illustrating a display panel included in the touch screen-integrated display device according to the present disclosure.

In the following, the display panel 110 included in the touch screen-integrated display device 100 according to an exemplary embodiment of the present disclosure, the method of applying a common voltage and a touch driving signal to the plurality of touch electrodes TE11 to TE14, TE21 to TE24 and TE31 to TE34 which functions as both the common electrodes and the touch electrodes as shown in FIG. 3, the method of applying a data voltage and a touch driving signal (or signal corresponding thereto) to the data lines DL, and the method of applying a data voltage and a touch driving signal (or signal corresponding thereto) to the gate lines GL, and the like, will be described in more detail.

FIG. 3 is a plan view illustrating a display panel included in the touch screen-integrated display device according to the present disclosure.

Referring to FIG. 3, as described above, the display panel 110 includes the plurality of data lines DL, the plurality of gate lines GL, and the plurality of touch electrodes TE11 to TE14, TE21 to TE24 and TE31 to TE34.

Further, the display panel 110 may operate in the display mode or the touch mode, as described above.

In this regard, the plurality of data lines DL and the plurality of gate lines GL formed on the display panel 110 are configured to enable the display panel 110 to function as a panel of displaying an image.

Further, the plurality of touch electrodes TE11 to TE14, TE21 to TE24 and TE31 to TE34 formed on the display panel 110 is configured to enable the display panel 110 to function as both a display panel and a touch screen panel.

More specifically, when the display panel 110 functions as a display panel, i.e. when a driving mode of the display panel 110 is the display mode, the plurality of electrodes TE11 to TE14, TE21 to TE24 and TE31 to TE34 functions as "common electrodes" (also referred to as the "Vcom electrodes") to which a common voltage Vcom is applied and which are disposed to face a pixel electrode (not illustrated).

Further, when the display panel 110 functions as a touch screen panel, i.e. when a driving mode of the display panel 110 is the touch mode, the plurality of touch electrodes TE11 to TE14, TE21 to TE24 and TE31 to TE34 functions as "touch electrodes" which form capacitors together with a touch pointer (for example, a finger, a pen, or the like) in response to a touch driving voltage applied thereto and measure capacitances of the capacitors.

In other words, the plurality of touch electrodes TE11 to TE14, TE21 to TE24 and TE31 to TE34 functions as the common electrodes (Vcom electrodes) in the display mode and the touch electrodes in the touch mode.

The plurality of touch electrodes TE11 to TE14, TE21 to TE24 and TE31 to TE34 is applied with the common voltage Vcom in the display mode and the touch driving signal in the touch mode.

Thus, as illustrated in FIG. 3, touch sensing lines SL11 to SL14, SL21 to SL24 and SL31 to SL34 may be respectively connected to the plurality of touch electrodes TE11 to TE14, TE21 to TE24 and TE31 to TE34 in order to transfer the common voltage or the touch driving signal to the plurality of touch electrodes TE11 to TE14, TE21 to TE24 and TE31 to TE34.

Accordingly, in the touch mode, a touch driving signal Vtd generated from the touch circuit 150 and the switching circuit 160 is applied to all or some of the plurality of touch electrodes TE11 to TE14, TE21 to TE24 and TE31 to TE34 through the touch sensing lines SL11 to SL14, SL21 to SL24 and SL31 to SL34. In the display mode, a common voltage Vcom supplied from a common voltage supply unit (not illustrated) is applied to the plurality of touch electrodes TE11 to TE14, TE21 to TE24 and TE31 to TE34 through the touch sensing lines SL11 to SL14, SL21 to SL24 and SL31 to SL34.

Referring to FIG. 3, subpixels SP are defined respectively corresponding to intersections between the plurality of data lines DL and the plurality of gate lines GL formed on the display panel 110. Herein, each subpixel may be one of red (R), green (G), blue (B), and white (W) subpixels.

Referring to FIG. 3, at least two subpixels SP may be defined in an area where each of the plurality of touch electrodes TE11 to TE14, TE21 to TE24 and TE31 to TE34 functioning as the common electrodes and the touch electrodes is formed. That is, one of the plurality of touch electrodes TE11 to TE14, TE21 to TE24 and TE31 to TE34 corresponds to two or more subpixels SP.

For example, a 24*3 number of data lines DL and 24 gate lines GL may be disposed in one area (unit touch electrode area) where each of the plurality of touch electrodes TE11 to TE14, TE21 to TE24 and TE31 to TE34 functioning as the common electrodes and the touch electrodes is formed, thereby defining a 24*3*24 number of subpixels SP.

Meanwhile, each of the plurality of touch electrodes TE11 to TE14, TE21 to TE24 and TE31 to TE34 functioning as the common electrodes and the touch electrodes may be a block-shaped pattern as illustrated in FIG. 3, or in some cases, each of the plurality of touch electrodes TE11 to TE14, TE21 to TE24 and TE31 to TE34 may be a pattern including a comb teeth pattern in an area corresponding to each subpixel SP.

The present disclosure can be applied to a case where each of the plurality of touch electrodes TE11 to TE14, TE21 to TE24 and TE31 to TE34 functioning as the common electrodes and the touch electrodes is the pattern including a comb teeth pattern.

Figure 4:
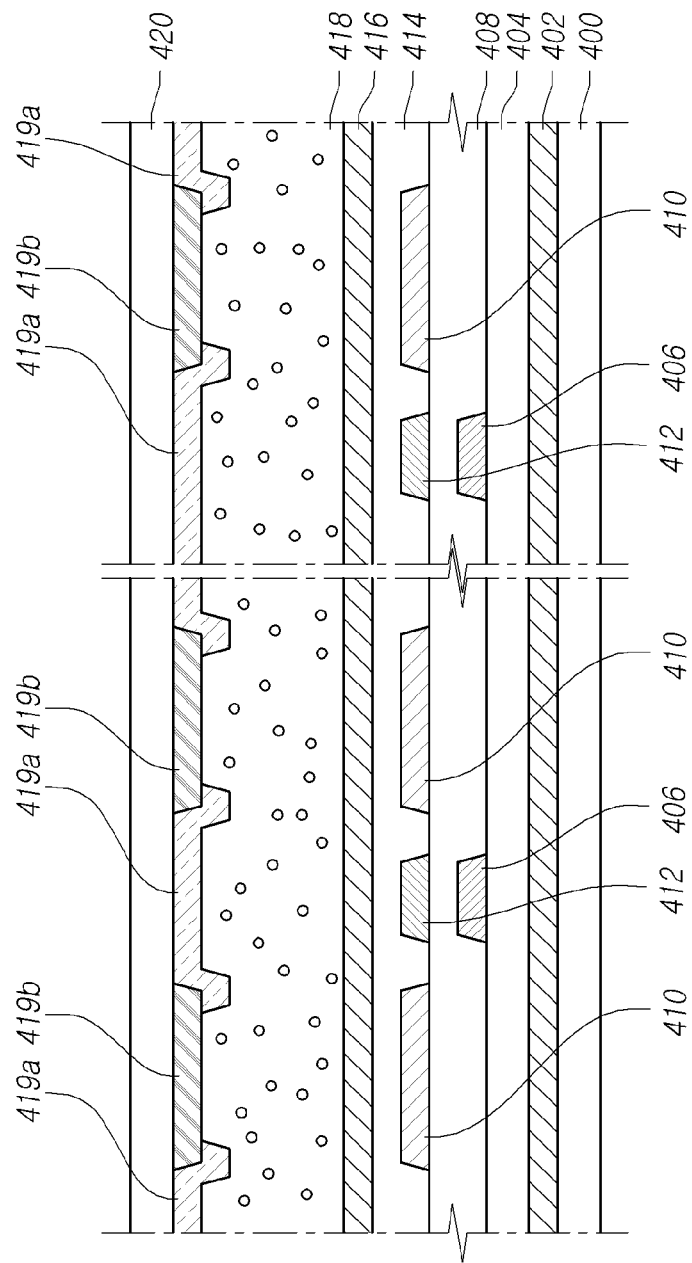
FIG. 4 is an exemplary cross-sectional view illustrating a display panel in the case where the touch screen-integrated display device according to an exemplary embodiment of the present disclosure is a liquid crystal display device.

FIG. 4 is an exemplary cross-sectional view illustrating a display panel in case where the touch screen-integrated display device 100 according to an exemplary embodiment of the present disclosure is a liquid crystal display device.

FIG. 4 is a cross-sectional view illustrating an area where one of the plurality of touch electrodes TE11 to TE14, TE21 to TE24 and TE31 to TE34 functioning as the common electrodes and the touch electrodes is formed.

Referring to FIG. 4, for example, in the display panel 110 included in the touch screen-integrated display device 100, a gate line 402 is formed in a first direction (a horizontal direction or left and right direction in FIG. 3) on a lower substrate 400, and a gate insulator 404 is formed thereon.

A data line 406 is formed in a second direction (a vertical direction or direction perpendicular to the ground in FIG. 3) on the gate insulator 404, and a first protective layer 408 is formed thereon.

A pixel electrode 410 and a touch sensing line 412 for each subpixel area are formed on the first protective layer 408, and a second protective layer 414 may be formed thereon. Herein, the touch sensing line 412 is connected from each of the plurality of touch electrodes TE11 to TE14, TE21 to TE24 and TE31 to TE34 functioning as the common electrodes and the touch electrodes to the switching circuit 160. Thus, in the display mode, the touch sensing line 412 transfers a common voltage Vcom generated from the common voltage supply unit to the plurality of touch electrodes TE11 to TE14, TE21 to TE24 and TE31 to TE34, and in the touch mode, the touch sensing line 412 transfers a touch driving signal generated from the touch circuit 150 and the switching circuit 160 to the plurality of touch electrodes TE11 to TE14, TE21 to TE24 and TE31 to TE34.

An electrode 416 functioning as a common electrode and a touch electrode is formed on the second protective layer 414, and a liquid crystal layer 418 is formed thereon. Herein, the electrode 416 functioning as a common electrode and a touch electrode is one of the plurality of touch electrodes TE11 to TE14, TE21 to TE24 and TE31 to TE34, and may be a block-shaped pattern.

An upper substrate 420 on which a black matrix 419a, a color filter 419b, and the like are formed is disposed on the liquid crystal layer 418.

Although FIG. 4 illustrates the liquid crystal display device, the present disclosure is not limited thereto but can be applied to various display devices which can be combined with a touch panel.

Figure 5:
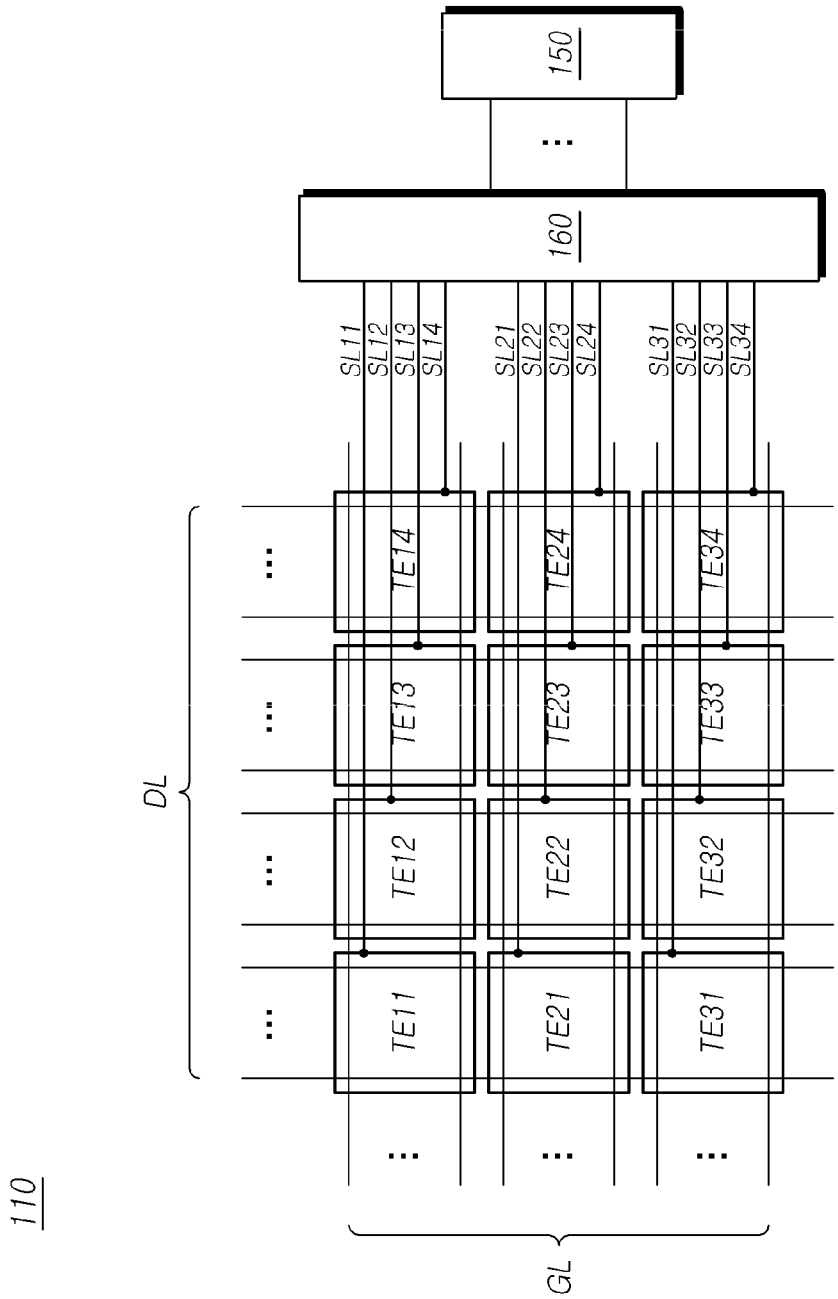
FIG. 5 is another plan view of a display panel included in the touch screen-integrated display device according to the present disclosure.

FIG. 5 is another plan view of a display panel included in the touch screen-integrated display device 100 according to the present disclosure.

Referring to FIG. 5, unlike FIG. 3, the touch sensing lines SL11 to SL14, SL21 to SL24 and SL31 to SL34 respectively connected to the plurality of touch electrodes TE11 to TE14, TE21 to TE24 and TE31 to TE34 to transfer the common voltage or the touch driving signal thereto may be formed in parallel with the second direction (for example, the horizontal direction) in which the gate lines GL are formed.

In this case, a touch driving signal generated from the touch circuit 150 and the switching circuit 160 illustrated in FIG. 1 or a common voltage generated or supplied from the common voltage supply unit may be transferred to all or some of the plurality of touch electrodes TE11 to TE14, TE21 to TE24 and TE31 to TE34 through the touch sensing lines SL11 to SL14, SL21 to SL24 and SL31 to SL34 formed in parallel with the gate lines.

Further, a thin film transistor disposed in each subpixel SP of the present disclosure may be formed of, for example, amorphous silicon (hereinafter, referred to as "a-Si"), metal oxide, and poly silicon. The poly silicon may include low temperature poly silicon (hereinafter, referred to as "LIPS") and high temperature poly silicon (hereinafter, referred to as "HIPS"), but is not limited thereto.

Figure 6:
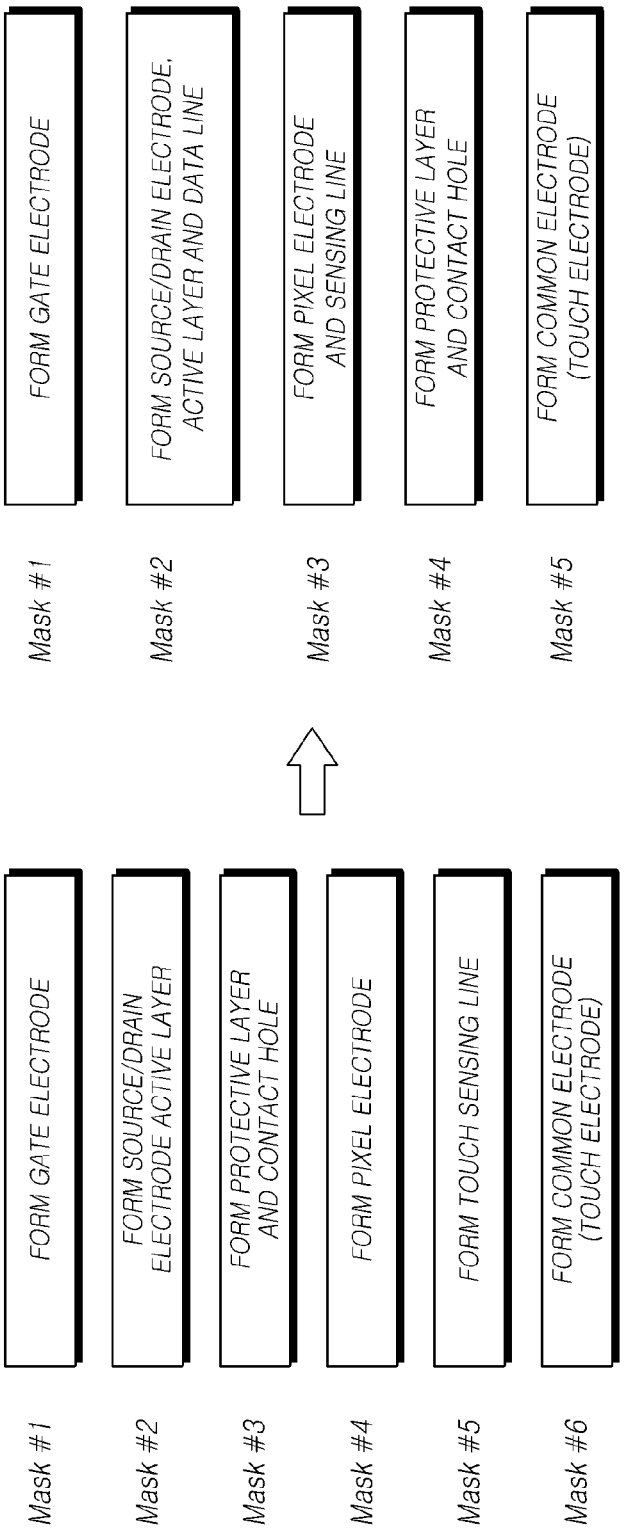
FIG. 6 is a diagram illustrating that the number of processes for fabricating a touch screen-integrated display device according to the present disclosure is reduced.

FIG. 6 is a diagram illustrating that the number of processes for fabricating a touch screen-integrated display device according to the present disclosure is reduced.

Referring to FIG. 6, a general process for fabricating a touch screen-integrated display device includes: a first mask process Mask #1 for forming a gate line and a gate electrode of a thin film transistor; a second mask process Mask #2 for forming an active layer of the thin film transistor formed in each subpixel, and a source electrode and a drain electrode on the active layer; a third mask process Mask #3 for forming a protective layer for protecting the thin film transistor and a contact hole; a fourth mask process Mask #4 for forming a pixel electrode in each subpixel; a fifth mask process Mask #5 for forming a touch sensing line; and a sixth mask process Mask #6 for forming a touch electrode (common electrode).

In particular, since the touch sensing line is additionally formed, the number of mask processes is increased. Furthermore, if a protective layer is additionally formed on the touch sensing line and a contact hole for electrically connecting the touch sensing line and the touch electrode (common electrode) is formed, the number of mask processes is further increased.

As such, in a touch screen-integrated display device, a separate touch sensing line needs to be formed within a display panel. Thus, the number of mask processes is increased.

Also, if the number of mask processes is increased, Tac time is increased, resulting in a decrease in production efficiency, and a defect rate caused by various contaminants or particles during the process is also increased.

According to the touch screen-integrated display device and the method for fabricating the same of the present disclosure, an array substrate of the display device can be completed through a first mask process Mask #1 for forming a gate electrode, a second mask process Mask #2 for forming an active layer, a source electrode, a drain electrode, and a data line, a third mask process Mask #3 for forming a pixel electrode and a touch sensing line at the same time, a fourth mask process Mask #4 for forming a protective layer and a contact hole, and a fifth mask process Mask #5 for forming a touch electrode (common electrode).

Particularly, in the touch screen-integrated display device of the present disclosure, thin film transistors respectively disposed in subpixels are disposed in a zigzag shape on both sides of a data line. Thus, the number of data lines can be reduced. Further, a touch sensing line between the data lines reduced in number is formed through the same process as the data line. Thus, the fabricating process can be simplified.

Furthermore, the touch sensing line is formed together in a process for forming a pixel electrode. Thus, there is an effect of reducing the number of mask processes.

Figure 7:
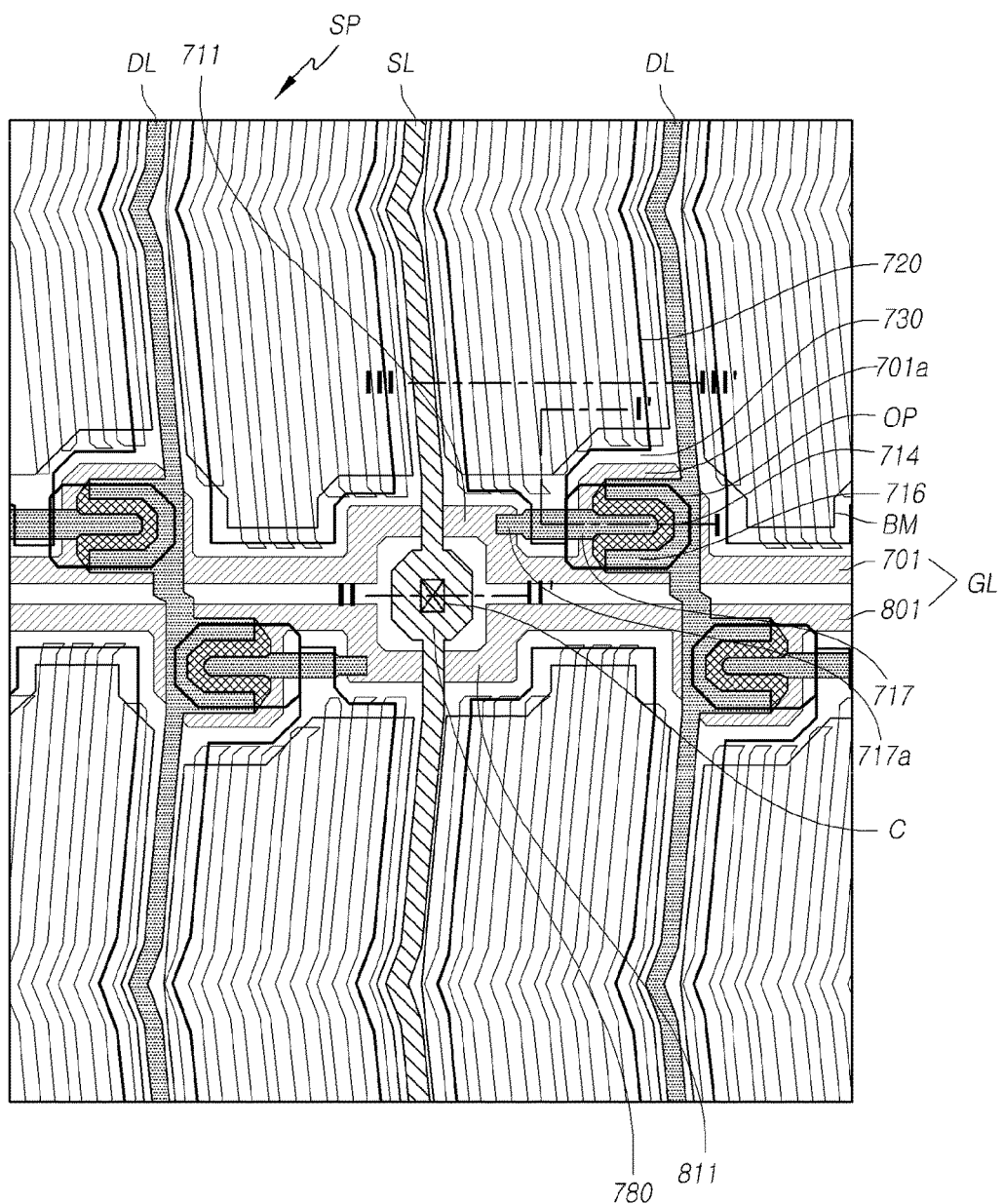
FIG. 7 is a plan view illustrating a structure of subpixels in a touch screen-integrated display device according to the present disclosure.
Figure 8:
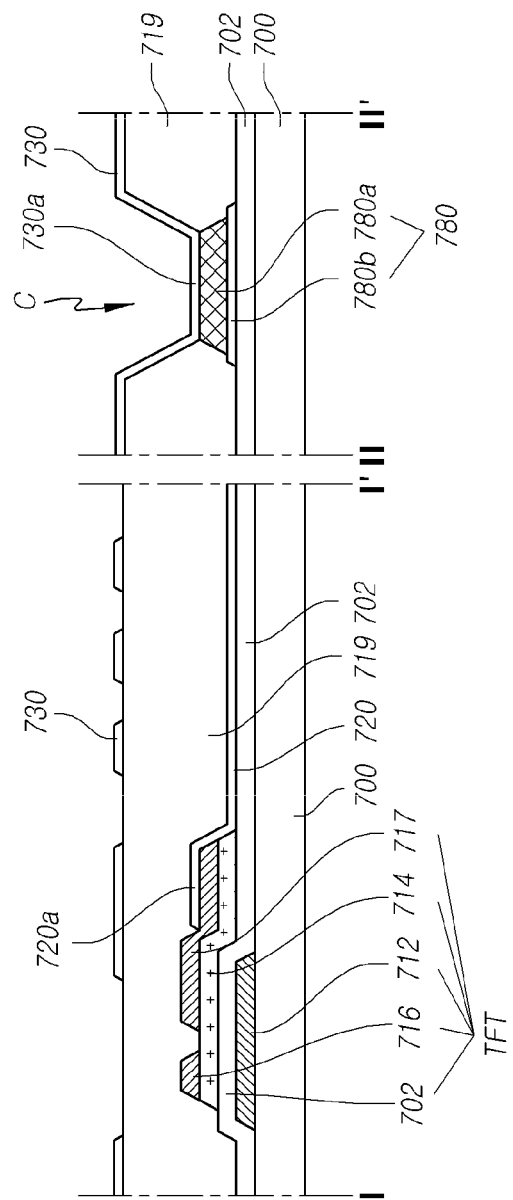
FIG. 8 and FIG. 9 are cross-sectional views taken along a line I-I', a line II-II', and a line III-III' of FIG. 7 according to the present disclosure.
Figure 9:
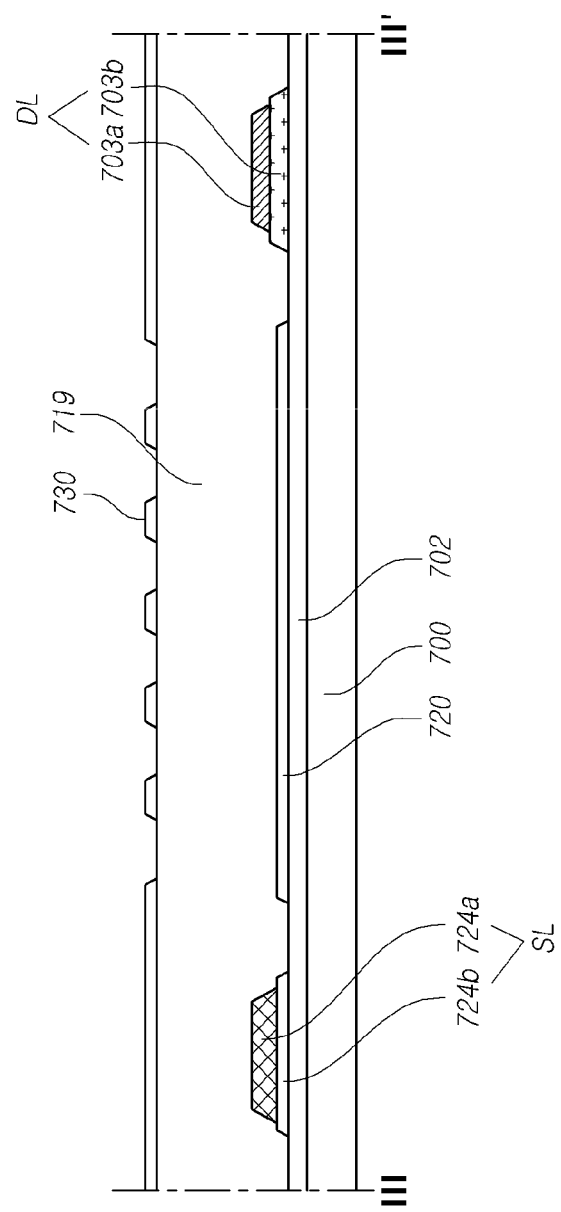

FIG. 7 is a plan view illustrating a structure of subpixels in a touch screen-integrated display device according to the present disclosure, and FIG. 8 and FIG. 9 are cross-sectional views taken along a line I-I', a line II-II', and a line III-III' of FIG. 7.

Referring to FIG. 7 through FIG. 9, the touch screen-integrated display device of the present disclosure includes a plurality of gate lines GL disposed in a first direction on a substrate 700, a plurality of data lines DL disposed in a second direction on the substrate 700, and a touch sensing line SL disposed in parallel and alternately with the data lines DL on the substrate 700.

Further, the touch screen-integrated display device further includes a plurality of subpixels SP. The subpixels SP are defined by the gate lines GL, the data lines DL, and the touch sensing line SL.

Further, thin film transistors TFTs are disposed at intersections between the gate lines GL and the data lines DL in the subpixels SP, respectively.

Particularly, in the touch screen-integrated display device of the present disclosure, the gate lines GL are disposed as a pair of first and second gate lines 701 and 801 adjacent to each other between subpixels SP disposed adjacent to each other in the first direction.

Therefore, one data line DL intersects with the first and second gate lines 701 and 801, and TFTs are disposed at an intersection between the first gate line 701 and the data line and an intersection between the second gate line 801 and the data line 801, respectively.

It can be seen that as illustrated in the drawing, TFTs are respectively disposed on a left subpixel and a right subpixel with respect to one data line DL. That is, in the touch screen-integrated display device of the present disclosure, TFTs are disposed in a zigzag shape on the left and right sides of a data line DL.

With this TFT layout, the number of data lines DL disposed on the display panel 110 can be reduced.

In each of the subpixels SP, a gate insulator 702 is disposed on the substrate 700, and a pixel electrode 720 is disposed the gate insulator 702. Further, a common electrode 730 is disposed to be overlapped with the pixel electrode 720 with a protective layer 719 interposed therebetween.

As illustrated in FIG. 1, the common electrode 730 has a block pattern structure corresponding to at least one subpixel or at least two subpixels and is electrically connected to the touch sensing line SL through a contact hole C.

Referring to FIG. 7, a first curved part 711 which is a curved part of the first gate line 701 is disposed at an intersection between the touch sensing line SL and the first gate line 701 of the pair of gate lines GL. The second gate line 801 also includes a curved part, which is a second curved part 811, so as to face the first curved part 711.

Each of the first curved part 711 and the second curved part 811 is overlapped with a part of the drain electrode 717 of the TFT disposed in a corresponding subpixel and thus functions to secure a storage capacitance of the subpixel.

A sensing contact part 780 formed by extending a part of the touch sensing line SL is disposed between the first and second curved parts 711 and 811. The common electrode 730 is electrically connected to the exposed sensing contact part 780 through the contact hole C.

Further, the common electrode 730 of the touch screen-integrated display device of the present disclosure is formed as a touch electrode corresponding to a plurality of subpixels as described above. Thus, the common electrode 730 is formed as one body in each sub pixel area except a slit-shaped open area and an opening OP corresponding to a TFT.

The reason why the opening OP of the common electrode 730 is formed at an area corresponding to a TFT is to reduce a parasitic capacitance between the common electrode 730 and the TFT and thus to suppress performance deterioration of the TFT.

Referring to the detailed cross-sectional views of the subpixel area in FIG. 8 and FIG. 9, a TFT including a gate electrode 712, a gate insulator 702, an active layer 714, a source electrode 716, and a drain electrode 717 is disposed at an intersection between the data line DL and the gate line GL (first gate line in FIG. 7) on the substrate 700.

Further, in the present disclosure, the pixel electrode 720 disposed on the gate insulator 702 is in direct contact with the drain electrode 717 of the TFT.

The protective layer 719 is laminated on the pixel electrode 720, and the common electrode 730 is disposed on the protective layer 719. The common electrode 730 may be formed into a plurality of slit patterns (refer to an area I-I').

Referring to an area II-II' of FIG. 8 together with FIG. 7, the touch sensing line SL is disposed in parallel with the data line, and the contact hole C is formed at an area of the sensing contact part 780 formed as one body with the touch sensing line SL. The touch sensing line SL and the common electrode 730 are electrically connected to each other through the contact hole C.

The sensing contact part 780 is formed into a structure in which a first sensing contact pattern 780a and a second sensing contact pattern 780b are laminated, and the second sensing contact pattern 780b is formed of the same material as the pixel electrode 720.

Further, referring to an area III-III' of FIG. 9 together with FIG. 7, the pixel electrode 720 is disposed on the gate insulator 702 on the substrate 700, the touch sensing line SL and the data line DL are disposed on the gate insulator 702 with the pixel electrode 720 interposed therebetween.

The touch sensing line SL is formed into a structure in which a first sensing pattern 724a and a second sensing pattern 724b are laminated, and the data line DL is formed in to a structure in which a first data pattern 703a and a second data pattern 703b are laminated.

The touch sensing line SL is formed together in a mask process for forming the pixel electrode 720. Thus, the second sensing pattern 724b is formed of the same transparent conductive material as the pixel electrode 720.

Further, the second data pattern 703b of the data line DL is formed together with the source electrode 716 and the drain electrode 717. Thus, the second data pattern 703b is formed of the same material as the active layer 714.

The protective layer 719 is disposed on the touch sensing line SL, the data line DL, and the pixel electrode 720, and the common electrode 730 is disposed on the protective layer 719 (area III-III').

In the touch screen-integrated display device of the present disclosure, TFTs are disposed in a zigzag shape in respective subpixels on the left and right sides of a data line DL. Thus, there is an effect of reducing the number of data lines.

Further, a touch sensing line and a data line can be disposed alternately due to the reduction in number of data lines. Thus, a touch screen-integrated display device can be implemented.

In the touch screen-integrated display device of the present disclosure, when a pixel electrode is formed, a touch sensing line can be formed together with the pixel electrode. Thus, there is an effect of implementing a touch screen-integrated display device without an additional mask process.

FIG. 10A through FIG. 14B are diagrams illustrating processes for fabricating a touch screen-integrated display device according to the present disclosure.

Figure 10B:
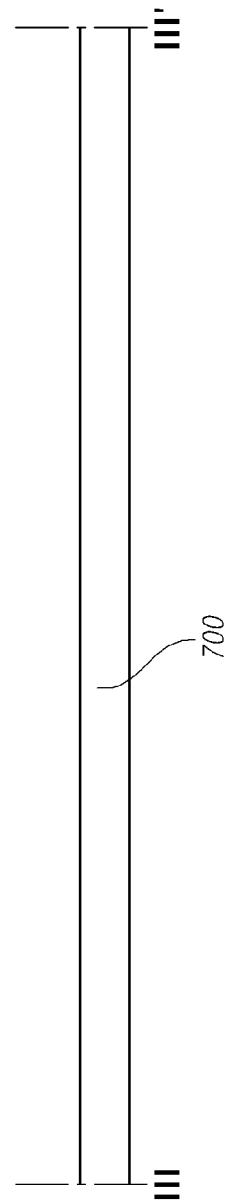

First, referring to FIG. 10A and FIG. 10B, gate metal layers are formed in sequence on the substrate 700 on which a plurality of subpixels is defined, and the gate electrode 712 of the TFT is formed in each subpixel area through a first mask process. Herein, the gate line GL illustrated in FIG. 7 is also formed.

Therefore, the gate metal layers may be formed by laminating at least two metal layers, and may be formed into a structure in which a gate metal layer and a transparent conductive material layer are laminated.

Therefore, the gate metal layer may be formed using at least one selected from the conductive metal group consisting of aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto.

Figure 11A:
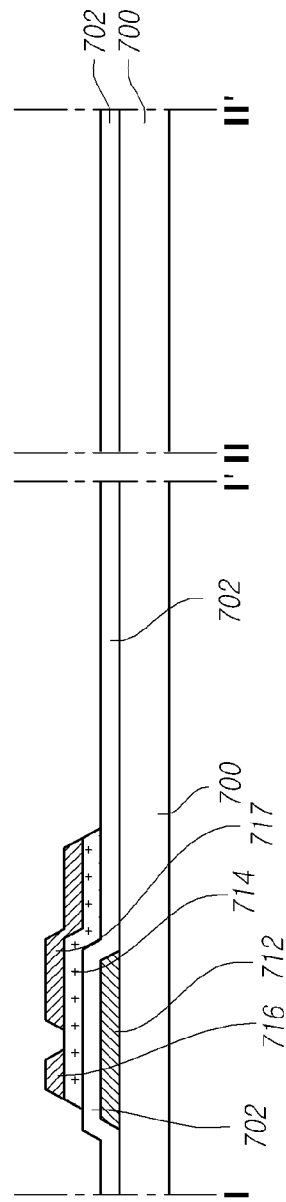
Figure 11B:
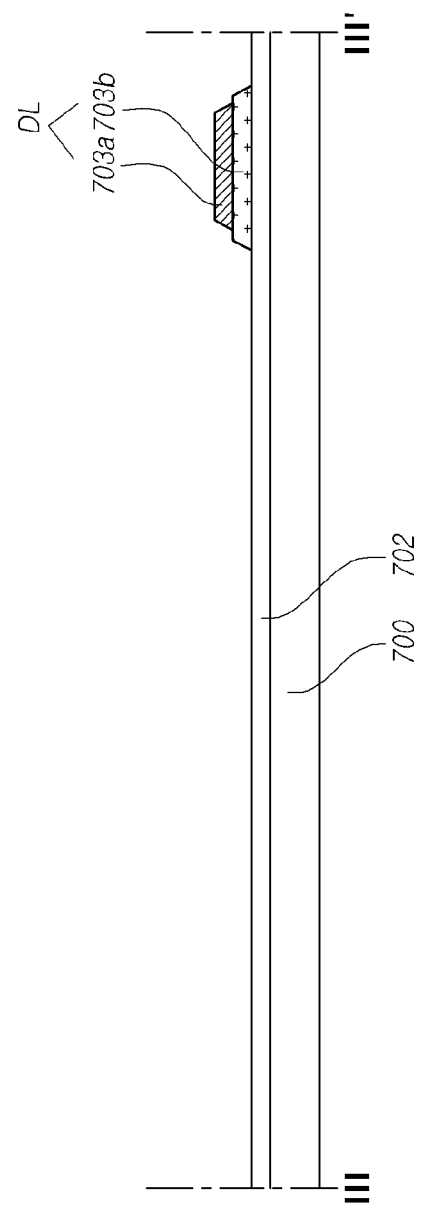

If the gate electrode 712 is formed on the substrate 700 as described above, the gate insulator 702 is formed on the entire surface of the substrate 700 and then a semiconductor layer and a source/drain metal layer are consecutively formed as illustrated in FIG. 11A and FIG. 11B.

The source/drain metal layer may be formed using at least one selected from the conductive metal group consisting of aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto.

The semiconductor layer may be formed of a semiconductor material such as amorphous silicon or polysilicon such as LIPS, HIPS, or the like. Further, the semiconductor layer may be formed using a semiconductor oxide material such as zinc oxide (ZO), indium gallium zinc oxide (IGZO), zinc indium oxide (ZIO), and Ga-doped ZnO (ZGO).

Then, the active layer 714, the source electrode 716, and the drain electrode 717 are formed on the gate insulator 702 corresponding to the gate electrode 712 through a second mask process using a diffraction mask or a halftone mask. A TFT includes the gate electrode 712, the gate insulator 702, the active layer 714, the source electrode 716, and the drain electrode 717.

Referring to the area III-III', the gate insulator 702 is formed on the substrate 700, and the data line DL is formed at the same time when the active layer 714, the source electrode 716, and the drain electrode 717 are formed on the gate insulator 702.

The data line DL is formed into the structure in which the first data pattern 703a and the second data pattern 703b are laminated, and the second data pattern 703b is formed of the same semiconductor material as the active layer 714.

Figure 12B:
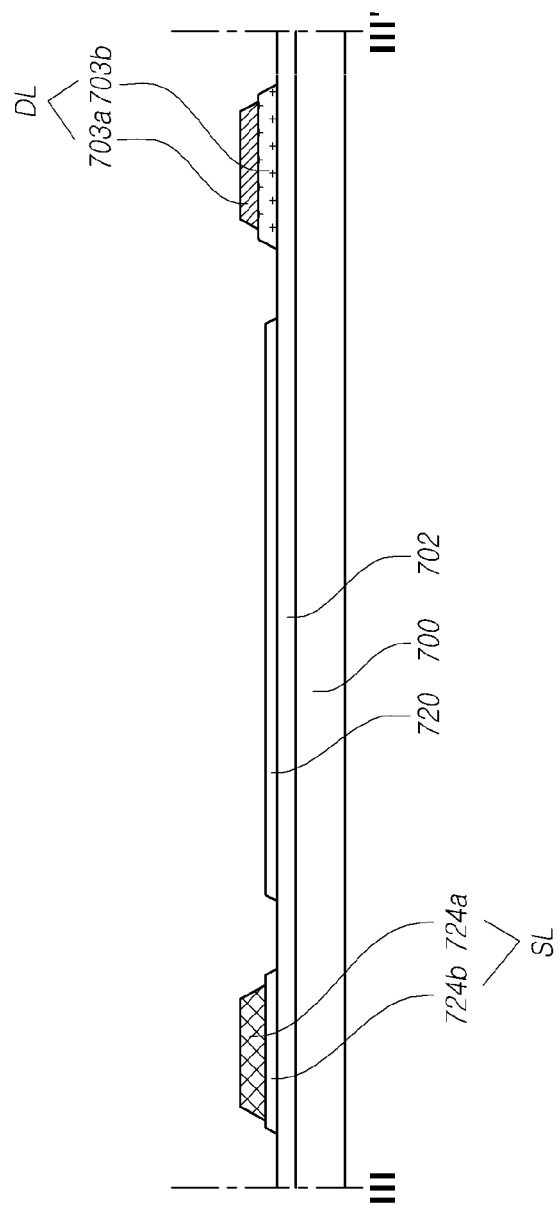

If the TFT and the data line DL are formed on the substrate 700 as described above, a transparent conductive material layer and a sensing metal layer are formed in sequence on the entire surface of the substrate 700 and then the pixel electrode 720 and the touch sensing line SL are formed together through a third mask process as illustrated in FIG. 12A and FIG. 12B.

The transparent conductive material layer may be formed using any one selected from the group consisting of ITO (Indium Tin Oxide), IZO (Indium Zinc Oxide), and CNT (Carbon Nano Tube), but is not limited thereto. The gate metal layer is not limited to be formed into a double metal layer, and thus can be formed into a single metal layer.

The touch sensing line SL is formed into the structure in which the first sensing pattern 724a and the second sensing pattern 724b are laminated, and the second sensing pattern 724b is formed of the same transparent conductive material as the pixel electrode 720.

The sensing contact part 780 formed as one body with the touch sensing line SL also includes a first sensing pattern 780a and a second sensing pattern 780b, and the second sensing pattern 780b is formed of the same transparent conductive material as the pixel electrode 720.

Further, in the present disclosure, an extension part 720a (e.g., a first portion of the pixel electrode 720) extended from the pixel electrode 720 is in direct contact with the drain electrode 717 such that the pixel electrode 720 can be brought into direct contact with the drain electrode 717.

As described above, in the present disclosure, the touch sensing line SL, the pixel electrode 720, and the data line DL are formed on the same plane, i.e., on the gate insulator 702.

Figure 13A:
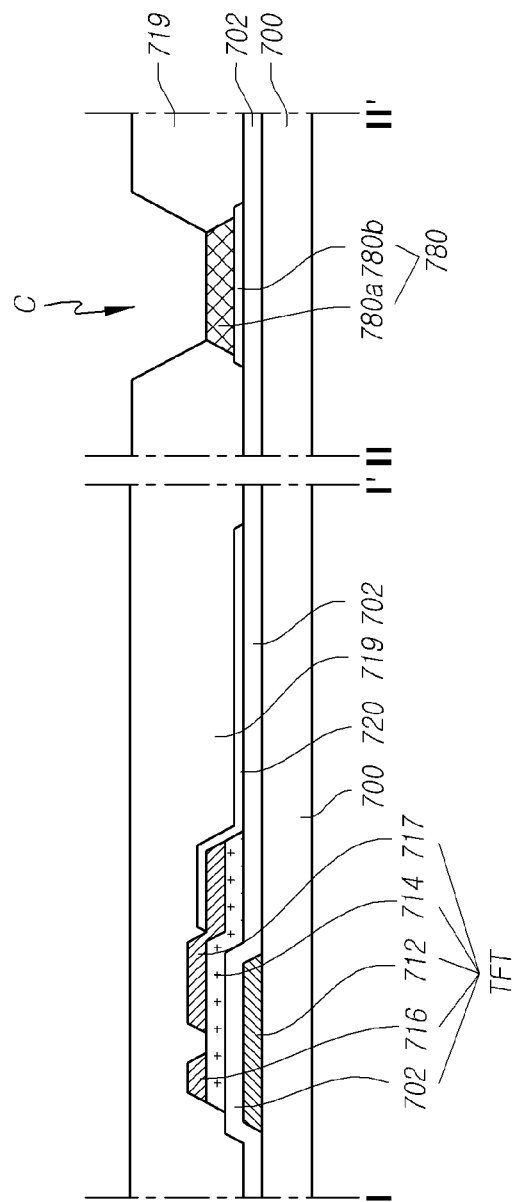
Figure 13B:
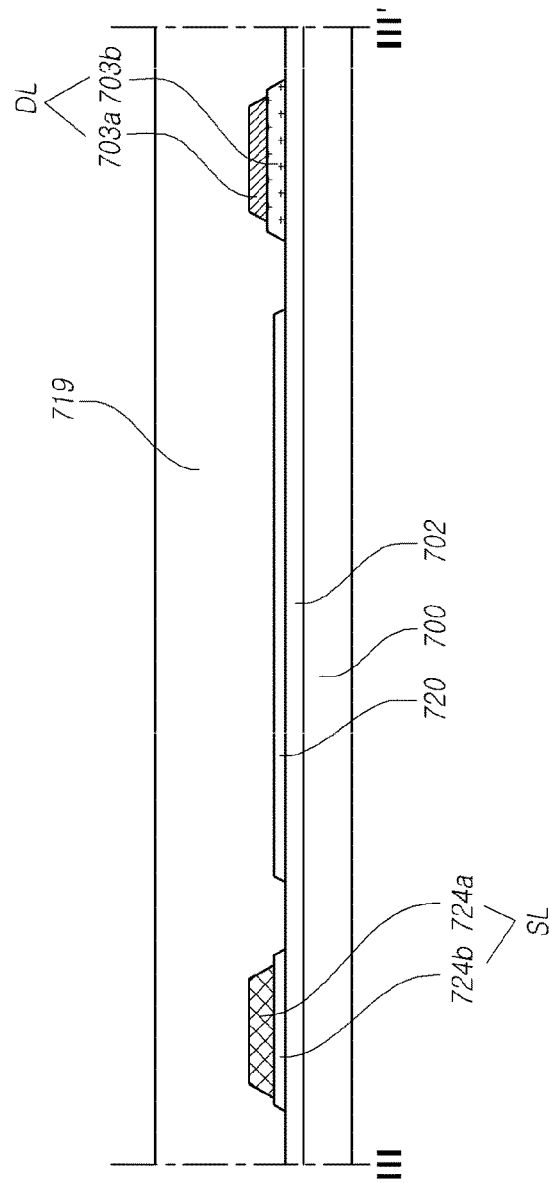

If the pixel electrode 720 and the touch sensing line SL are formed on the substrate 700 as described above, the protective layer 719 is formed on the entire surface of the substrate 700 as illustrated in FIG. 13A and FIG. 13B. If the protective layer 719 is formed on the substrate 700, the contact hole C that exposes an area of the sensing contact part 780 of the touch sensing line SL is formed through a fourth mask process.

The sensing contact part 780 is exposed to the outside by the contact hole C.

The protective layer 719 may be formed of an inorganic material such as $SiO_2$ and SiNx, or an organic material such as photo acryl, but the present invention is not limited thereto.

Figure 14B:
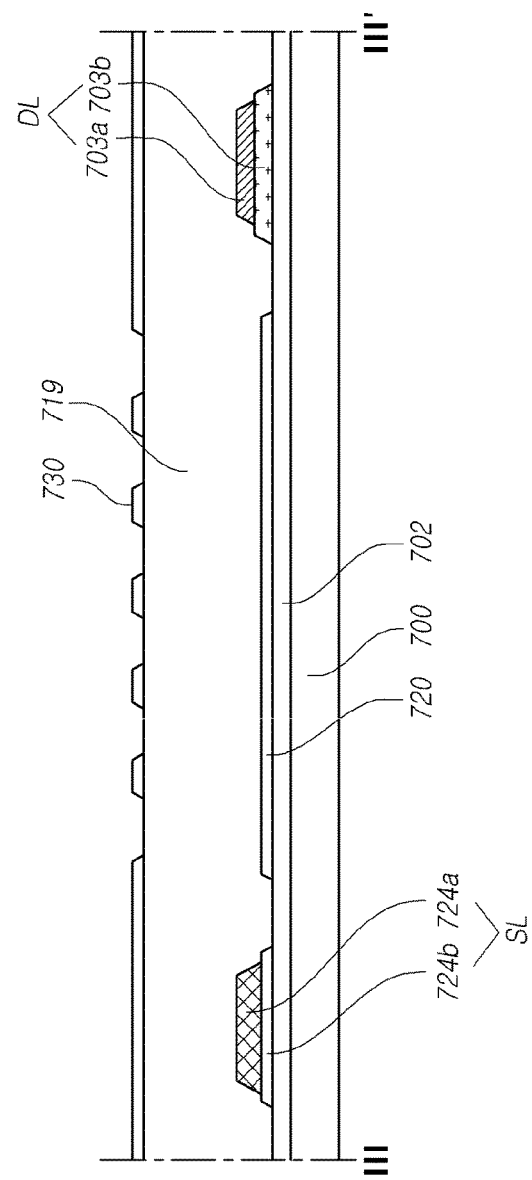

If the protective layer 719 is formed on the substrate 700 as described above, a transparent conductive material layer is formed on the entire surface of the substrate 700 and then the common electrode 730 overlapped with the pixel electrode 720 is formed through a fifth mask process as illustrated in FIG. 141A and FIG. 14B.

The transparent conductive material layer may be formed using any one selected from the group consisting of ITO (Indium Tin Oxide), IZO (Indium Zinc Oxide), and CNT (Carbon Nano Tube), but is not limited thereto.

As described above, the common electrode 730 may be a touch electrode and may be formed into a block pattern structure corresponding to a plurality of subpixels.

The common electrode 730 may be formed into a plurality of slit patterns in each subpixel area.

Further, a contact part 730a is formed as a transparent conductive material layer in the contact hole C at the same time when the common electrode 730 is formed.

As such, in a touch screen-integrated display device and a method for fabricating the same according to the present disclosure, TFTs are disposed in a zigzag shape in subpixels on the left and right sides of a data line. Thus, there is an effect of reducing the number of data lines disposed on a display panel.

Further, in a touch screen-integrated display device and a method for fabricating the same according to the present disclosure, touch sensing lines are formed at the same time when pixel electrodes are formed. Thus, there is an effect of reducing the number of mask processes.

The foregoing description and the accompanying drawings are provided only to illustrate the technical conception of the present invention, but it will be understood by a person having ordinary skill in the art that various modifications and changes such as combinations, separations, substitutions, and alterations of the components may be made without departing from the scope of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A touch screen-integrated display device comprising:
   a plurality of gate lines disposed in a first direction on a substrate, the plurality of gate lines including a first gate line and a second gate line that is adjacent to the first gate line without any intermediate gate lines between the first gate line and the second gate line;
   a plurality of data lines disposed in a second direction on the substrate that is different from the first direction, the plurality of data lines including a first data line and a second data line that is adjacent to the first data line without any intermediate data lines between the first data line and the second data line;
   a touch sensing line disposed in the second direction, the touch sensing line disposed between the first data line and the second data line on the substrate;
   a plurality of subpixel areas defined by the plurality of gate lines, the plurality of data lines, and the touch sensing line, and including a first transistor and a second transistor, wherein the first transistor is electrically connected to the first data line and the first gate line and disposed on a left side of the first data line, and drives a first subpixel within the plurality of subpixel areas based on a voltage on the first data line, and the second transistor is electrically connected to the second data line and the second gate line, disposed on a right side of the second data line, and drives a second subpixel within the plurality of subpixel areas based on a voltage on the second data line;

wherein at least one of the first transistor or the second transistor comprises:
  a gate electrode;
  an active layer on the gate electrode;
  a source electrode and a drain electrode on the active layer;
  a gate insulator between the gate electrode and the active layer;
  a pixel electrode including a first portion and a second portion, the first portion of the pixel electrode on the drain electrode and the second portion of the pixel electrode on the gate insulator; and
a sensing contact part provided on the gate insulator and connected to the touch sensing line, the sensing contact part including a first sensing contact pattern and a second sensing contact pattern, and
wherein the second sensing contact pattern comprises a same material as the pixel electrode;
wherein the first gate line includes a first protrusion disposed at an intersection between the touch sensing line and the first gate line, and the second gate line includes a second protrusion disposed at an intersection between the touch sensing line and the second gate line, wherein the first protrusion protrudes from the first gate line in a first direction and the second protrusion protrudes from the second gate line away from the first protrusion in a second direction that is opposite the first direction,
wherein the first protrusion overlaps the drain electrode of the first transistor, and the second protrusion overlaps the drain electrode of the second transistor.

2. The touch screen-integrated display device according to claim 1, further comprising:
  a protective layer on the gate insulator, the protective layer including a contact hole that exposes a portion of the sensing contact part.

3. The touch screen-integrated display device according to claim 2, further comprising:
  a common electrode on the protective layer, the common electrode in contact with the portion of the sensing contact part that is exposed via the contact hole.

4. The touch screen-integrated display device according to claim 3, wherein the common electrode includes a plurality of slit patterns in the subpixel area.

5. The touch screen-integrated display device according to claim 1, wherein the pixel electrode disposed in the subpixel area is in direct contact with the drain electrode.

6. The touch screen-integrated display device of claim 1, wherein the first transistor being disposed on the left side of the first data line and the second transistor being disposed on the right side of the second data line is from a same orientation of the touch screen-integrated display device.

7. The touch-screen display device of claim 1, wherein the touch sensing line is disposed on a left side of the first data line and a right side of the second data line, and
  wherein an end of the drain electrode of the first transistor is disposed at a right side of the touch sensing line and overlaps a portion of the first protrusion, and
  wherein an end of the drain electrode of the second transistor is disposed at a left side of the touch sensing line and overlaps a portion of the second protrusion.

8. The touch screen-integrated display device of claim 1, wherein the first protrusion and the second protrusion surround the sensing contact part.

9. A method for fabricating a touch screen-integrated display device, the method comprising:
  forming a gate electrode on a substrate using a first mask process;
  forming a gate insulator over the gate electrode using a second mask process;
  forming a semiconductor layer and an electrode metal layer on the gate insulator using the second mask process;
  forming an active layer, a source electrode, a drain electrode, and a data line using the second mask process, the source electrode and the drain electrode formed from the electrode metal layer;
  sequentially forming a first transparent conductive material layer on a portion of the drain electrode and a sensing metal layer on the gate insulator using a third mask process;
  forming a pixel electrode from the first transparent conductive material layer and a touch sensing line and a sensing contact part from the sensing metal layer using the third mask process;
  forming a protective layer over the pixel electrode and the touch sensing line using a fourth mask process;
  forming a contact hole through the protective layer that exposes a portion of the sensing contact part using the fourth mask process;
  forming a second transparent conductive material layer on the protective layer that is in contact with the sensing contact part via the contact hole using a fifth mask process; and
  forming a common electrode that is overlapped with the pixel electrode from the second transparent conductive material layer through the fifth mask process.

10. The method for fabricating a touch screen-integrated display device according to claim 9, wherein forming the touch sensing line comprises: laminating a first sensing pattern using the sensing metal layer and a second sensing pattern using the first transparent conductive material.

11. The method for fabricating a touch screen-integrated display device according to claim 9, wherein the common electrode is a touch electrode having a block pattern structure corresponding to at least two subpixels.

12. The method for fabricating a touch screen-integrated display device according to claim 9, wherein the pixel electrode, the touch sensing line, and the data line are disposed between the gate insulator and the protective layer.

13. The method for fabricating a touch screen-integrated display device according to claim 9, wherein a contact part is formed in the contact hole, the contact part electrically connecting the touch sensing line and the common electrode during the fifth mask process.

14. The method for fabricating a touch screen-integrated display device according to claim 13, wherein the contact part and the common electrode are formed as one body.

15. A touch screen-integrated display device comprising:
  a plurality of gate lines extending along a first direction on a substrate, the plurality of gate lines including a first gate line and a second gate line that is adjacent to the first gate line without any intermediate gate lines between the first gate line and the second gate line;
  a plurality of data lines extending along a second direction, the plurality of data lines on a gate insulator that is on the substrate, wherein the plurality of data lines includes a first data line;

a touch sensing line between the plurality of data lines on the substrate;

a first subpixel at an intersection of the first gate line and the first data line, the first subpixel including:
- a first transistor that is electrically connected to the first data line and the first gate line and disposed on a left side of the first data line, and drives the first subpixel based on a first voltage on the first data line, the first transistor including:
  - a gate electrode on the substrate,
  - a part of the gate insulator over the gate electrode,
  - an active layer on the part of the gate insulator that is over the gate electrode,
  - a drain electrode on the active layer,
  - a source electrode on the active layer, and
  - a pixel electrode that is electrically connected to the drain electrode;

a second subpixel at an intersection of the second gate line and the first data line, the second subpixel including a second transistor that is electrically connected to the first data line and the second gate line and disposed on a right side of the first data line, and drives the second subpixel within based on a second voltage on the first data line, and a sensing contact part on the gate insulator, the sensing contact part connected to the touch sensing line, and wherein a portion of the sensing contact part comprises a same material as the pixel electrode;

wherein the first gate line includes a first protrusion disposed at an intersection between the touch sensing line and the first gate line, and the second gate line includes a second protrusion disposed at an intersection between the touch sensing line and the second gate line, wherein the first protrusion protrudes from the first gate line in a first direction and the second protrusion protrudes from the second gate line away from the first protrusion in a second direction that is opposite the first direction, wherein the first protrusion overlaps the drain electrode of the first transistor, and the second protrusion overlaps the drain electrode of the second transistor.

16. The touch screen-integrated display device of claim 15, wherein the pixel electrode includes a first portion and a second portion, the first portion of the pixel electrode directly on the drain electrode and the second portion of the pixel electrode directly on the gate insulator.

17. The touch screen-integrated display device of claim 15, wherein the sensing contact part comprises:
- a first sensing contact part on the gate insulation layer, the first sensing contact comprising a same material as the pixel electrode; and
- a second sensing contact part on the first sensing contact part, the second sensing contact part comprising a different material from the pixel electrode.

18. The touch screen-integrated display device of claim 17, wherein the sensing line comprises:
- a first sensing pattern on the gate insulator, the first sensing pattern made of a same material as the first sensing contact part and the pixel electrode; and
- a second sensing pattern on the first sensing pattern, the second sensing pattern made of a same material as the second sensing contacting part.

19. The touch screen-integrated display device of claim 15, further comprising:
- a protective layer over the transistor and the sensing contact part, the protective layer including a contact hole that exposes a portion of the sensing contact part.

20. The touch screen-integrated display device of claim 19, further comprising: a common electrode on the protective layer and the common electrode in contact with the portion of the sensing contact part that is exposed via the contact hole.

21. The touch screen-integrated display device according to claim 20, wherein the common electrode includes a plurality of slit patterns in area of the display device including the subpixel.

* * * * *